US012695645B2

(12) United States Patent
Mathur et al.

(10) Patent No.: US 12,695,645 B2
(45) Date of Patent: Jul. 28, 2026

(54) RESOURCE SHARING BETWEEN CLOUD-HOSTED VIRTUAL NETWORKS

(71) Applicant: Amazon Technologies, Inc., Seattle, WA (US)

(72) Inventors: Piyush Mathur, Sammamish, WA (US); Oleg Albe, Sammamish, WA (US); Ashish Kumar, Seattle, WA (US); Joseph Elmar Magerramov, Bellevue, WA (US); Nishant Mehta, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 571 days.

(21) Appl. No.: 18/081,496

(22) Filed: Dec. 14, 2022

(65) Prior Publication Data

US 2024/0205051 A1    Jun. 20, 2024

(51) Int. Cl.
H04L 12/46    (2006.01)
H04L 9/40    (2022.01)

(52) U.S. Cl.
CPC .......... H04L 12/4675 (2013.01); H04L 63/10 (2013.01)

(58) Field of Classification Search
CPC ............. H04L 12/4633; H04L 12/4641; H04L 12/4675; H04L 63/10; H04L 2212/00
See application file for complete search history.

(56) References Cited

U.S. PATENT DOCUMENTS

| | | | | |
|---|---|---|---|---|
| 7,055,171 | B1 * | 5/2006 | Martin | ................ H04L 12/4641 |
| | | | | 713/153 |
| 11,012,521 | B1 * | 5/2021 | Fuller | ................... H04L 67/535 |
| 2013/0227171 | A1 * | 8/2013 | Nam | ....................... H04L 12/46 |
| | | | | 709/246 |
| 2015/0281059 | A1 * | 10/2015 | Xiao | ................... G06F 9/45558 |
| | | | | 709/238 |
| 2016/0028737 | A1 * | 1/2016 | Srinivasan | .......... H04L 63/0807 |
| | | | | 726/4 |
| 2019/0268421 | A1 * | 8/2019 | Markuze | ................ H04L 67/10 |
| 2019/0334868 | A1 * | 10/2019 | Tewari | ............... G06F 9/45558 |
| 2020/0389428 | A1 * | 12/2020 | Mittal | ................ H04L 61/2514 |

(Continued)

FOREIGN PATENT DOCUMENTS

WO    2023/102058 A1    6/2023

OTHER PUBLICATIONS

International Search Report and Written Opinion, PCT App. No. PCT/US2023/080368, Feb. 22, 2024, 10 pages.

(Continued)

*Primary Examiner* — Jeong S Park
(74) *Attorney, Agent, or Firm* — Nicholson De Vos Webster & Elliott LLP

(57) ABSTRACT

Techniques for resource sharing between cloud-hosted virtual networks are described. A first network address of a first virtual network is associated with a resource connected to a second virtual network, the first and second virtual networks within a cloud provider network. A service of the cloud provider network receives a message destined for the first network address. The service translates the first network address to a second network address of the resource in the second virtual private network. The service sends the message to the resource at the second network address in the second virtual network.

17 Claims, 8 Drawing Sheets

(56) References Cited

U.S. PATENT DOCUMENTS

| 2021/0084003 | A1* | 3/2021 | Sharma ............... H04L 61/5007 |
| 2021/0258216 | A1 | 8/2021 | Janakiraman et al. |
| 2022/0263793 | A1 | 8/2022 | Baker et al. |

OTHER PUBLICATIONS

Srisuresh et al., "IP Network Address Translator (NAT) Terminology and Considerations", Network Working Group, Request for Comments: 2663, Aug. 1999, 30 pages.
International Preliminary Report on Patentability, PCT App. No. PCT/US2023/080368, Jun. 26, 2025, 7 pages.
Troy Levin, Private endpoints for Oracle services, Mar. 24, 2022, 1-5, https://blogs.oracle.com/cloud-infrastructure/private-endpoints-for-oracle-services.

* cited by examiner

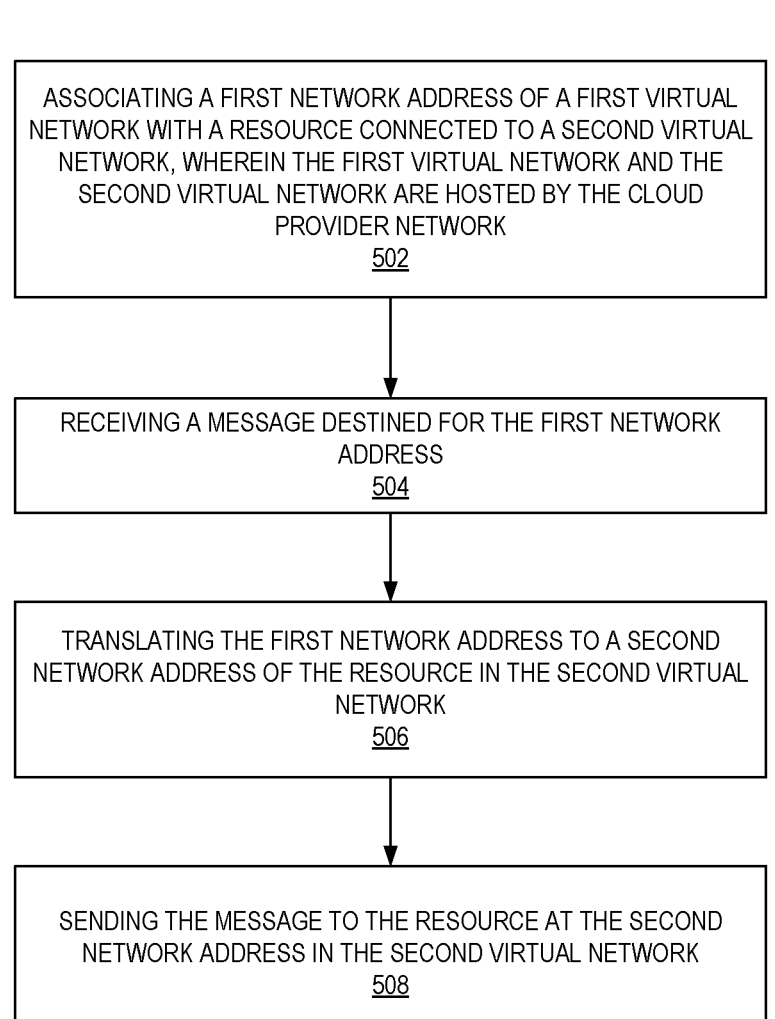

OPERATIONS
500

ASSOCIATING A FIRST NETWORK ADDRESS OF A FIRST VIRTUAL
NETWORK WITH A RESOURCE CONNECTED TO A SECOND VIRTUAL
NETWORK, WHEREIN THE FIRST VIRTUAL NETWORK AND THE
SECOND VIRTUAL NETWORK ARE HOSTED BY THE CLOUD
PROVIDER NETWORK
502

RECEIVING A MESSAGE DESTINED FOR THE FIRST NETWORK
ADDRESS
504

TRANSLATING THE FIRST NETWORK ADDRESS TO A SECOND
NETWORK ADDRESS OF THE RESOURCE IN THE SECOND VIRTUAL
NETWORK
506

SENDING THE MESSAGE TO THE RESOURCE AT THE SECOND
NETWORK ADDRESS IN THE SECOND VIRTUAL NETWORK
508

*FIG. 5*

RESOURCE SHARING BETWEEN CLOUD-HOSTED VIRTUAL NETWORKS

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the drawings, in which:

FIG. 5 illustrates operations of a method for resource sharing between virtual networks of a cloud provider network according to some examples.

DETAILED DESCRIPTION

Figure 1:
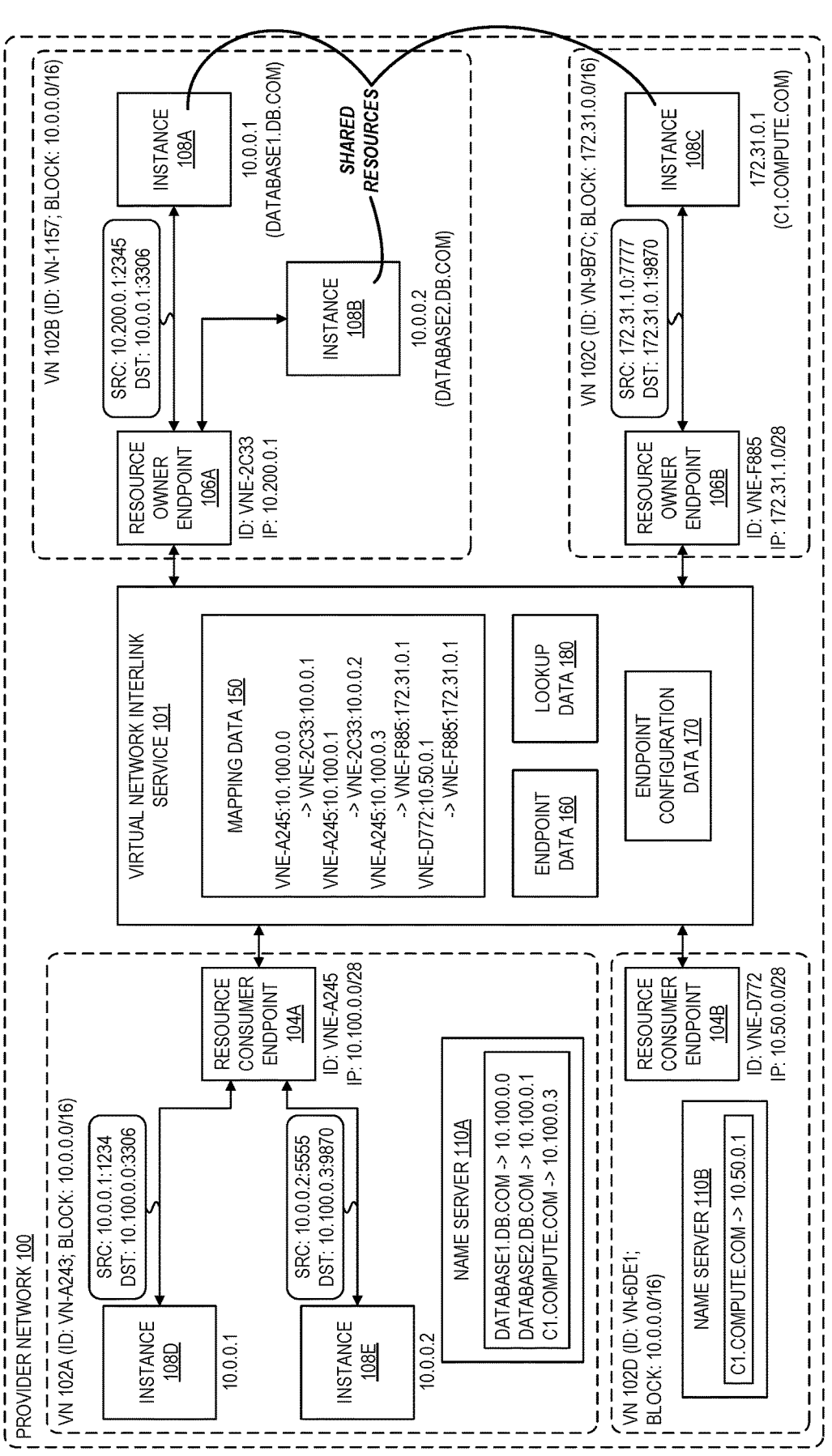
FIG. 1 illustrates an environment for resource sharing between virtual networks of a cloud provider network according to some examples.

The present disclosure relates to a private link endpoint, referred to herein as a "resource endpoint," that enables private and secure connectivity from a virtual network (such as a virtual private cloud (VPC)) to specific resources (ex: databases, clusters, virtual machine instances) in another virtual network. As an example, a customer of a cloud provider network can use a resource endpoint to connect to cloud services as well as third party services hosted on the cloud. When both virtual networks are part of the same larger network environment, such as a cloud provider network, connectivity over a resource endpoint can beneficially be done without routing any traffic to the Internet. This includes implementations in which a customer has a direct connection between their on-premise compute environment and the cloud provider's region(s). Bypassing the Internet can be particularly useful for certain types of workloads, such as stores of sensitive data, that have security and compliance requirements that prevent the use of Internet gateways or virtual network peering. Resource endpoints allow private and secure connection to such data stores across account and virtual network boundaries. Resource endpoints can also help accomplish low-latency use cases across account boundaries, in some examples delivering sub-millisecond latency Examples relate to methods, apparatus, systems, and non-transitory computer-readable storage media for resource sharing between cloud-hosted virtual networks. According to some examples, a virtual network interlinking service introduces resource endpoints into virtual networks to share a resource with other virtual networks or to access a shared resource in another virtual network. More specifically, a customer of a cloud provider network can introduce a resource "owner" endpoint into their virtual network and selectively configure both which resources in the virtual network are shared by that resource owner endpoint and to whom each resource is shared. The same or another customer can introduce a resource "consumer" endpoint into a different virtual network and selectively configure which resources that have been shared with that virtual network are accessible within the virtual network. The resource consumer endpoint is associated with a network address prefix within which individual network addresses can be associated with each accessible shared resource. The virtual network interlinking service translates addressing data from the resource consumer endpoint to the resource owner endpoint to provide for the transit of messages received by the resource consumer endpoint to the corresponding resource owner endpoint and ultimately to the shared resource.

Cloud provider network customers often deploy resources (e.g., databases, clusters, etc.) into a cloud-hosted virtual network. Sometimes, however, those customers may want to provide a limited cross-virtual network sharing due to internal or external security or compliance requirements rather than typical "general" cross-network access such as via a gateway to the internet or by peering virtual networks (e.g., where all of the devices connected to one virtual network can connect to the devices on another virtual network (and vice versa)). As customers move to multi-account and multi-virtual network environments and want to provide access to resources across accounts or virtual networks or even to their customers having separate virtual networks, the virtual network interlinking service described herein provides for the private and secure connectivity to resources across virtual network boundaries. There are several use cases for resource endpoints, for example cross-VPC access to resources, private access to VPC resources from on-premise networks, and one-to-many access use cases that require accessing multiple resources from a single endpoint (one-to-many). As an example of the latter, resource endpoints can be used for use cases where network monitoring tools in central VPCs owned by security teams need to scan virtual machine instances in multiple VPCs without requiring VPC peering or gateways to inter-connect the VPCs.

The disclosed technology provides a number of technical benefits. For example, resource endpoints provide private, secure connectivity to individual resources in other VPCs. For resource consumers, resource endpoints can provide the ability to have unidirectional (consumer initiated) communication with the shared resource, the ability to access multiple resources in different VPCs through a single endpoint, the ability to access resources across a resource endpoint from on-premises networks over VPN and direct connection, the ability to establish connectivity to resources across VPCs with overlapping/non-overlapping CIDRs, and sub-millisecond latency for highly latency sensitive use-cases like database accesses. For resource owners, resource endpoints can provide enhanced security and privacy by exposing only specific resources to specific accounts, users, roles, organizational units, organizations, and the like, allow owners to quickly share resources without requiring additional infrastructure like load balancers, the ability to unilaterally terminate an existing connection to a resource, and the ability to share multiple resources through a single endpoint.

FIG. 1 illustrates an environment for resource sharing between virtual networks of a cloud provider network according to some examples. As shown, a cloud provider network 100 includes a virtual network interlink service 101 providing connectivity between virtual networks 102A, 102B, 102C, and 102D as described below. A cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of cloud provider networks can use one or more user accounts that are associated with a customer account, though these terms can be used somewhat interchangeably depending upon the context of use. Users can interact with a cloud provider network across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network that includes "backend" services supporting and enabling the services that can be more directly offered to customers.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

A virtual private cloud (VPC) (also referred to as a virtual network (VNet or VN), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

VPCs/VNs often have virtualized components analogous to that of physical computer networks. Such components can include virtual network interfaces (VNIs) to attach a virtualized instance to the VN (sometimes referred to as elastic network interfaces), a virtual router to handle routing of traffic amongst the connected virtualized instances, virtual gateways to provide connectivity to or from resources outside of the virtual network, etc.

Traffic traversing a virtual network is typically encapsulated within traffic traversing the underlying physical network substrate of the cloud provider network. In this manner, a virtual network may be thought of as an overlay network operating on top of the physical network of the cloud provider network.

The virtual network interlink service 101 provides for private and secure connectivity to resources across virtual network boundaries. To do so, the virtual network interlink service 101 introduces resource endpoints within VNs. Resource endpoints provide a foothold for traffic to transit between individual VNs and the virtual network interlink service 101, typically realized as virtual network interfaces providing a communications pathway between the virtual network interlink service 101 and various customer VNs. In the examples illustrated and described herein, resource endpoints are divided into two types: resource owner endpoints and resource consumer endpoints.

In some examples, the virtual network interlink service 101 as described herein can be divided across one or more sub-services of the cloud provider network.

A resource owner endpoint allows a user to share one or many resources in their VN and to specify, for each shared resource, with whom the resource is shared. Thus, a single resource owner endpoint allows many different entities in many other VNs to connect to many resources in the user's VN. A resource consumer endpoint allows a user to create a network address in their VN for each shared resource in other VNs that the user wants to be accessible from within their VN. Thus, a single resource consumer endpoint provides entities in the user's VN access to shared resources many other VNs.

In some examples, entities in a VN having a resource consumer endpoint can initiate connections to shared resources in other VNs. At the same time, entities in a VN having a shared resource cannot automatically connect to entities in another VN with which the resource is shared (absent explicit resource-sharing via an endpoint as described herein). In this manner, the virtual network interlink service 101 provides unidirectional connectivity.

The virtual network interlink service 101 can provide for the address translation and routing of traffic between VNs via resource consumer endpoints and resource owner endpoints.

In the illustrated example, an administrator (also sometimes referred to as an owner, manager, or admin) of VN 102B has created a resource owner endpoint 106A via the virtual network interlink service 101 within VN 102B and shared two resources of VN 102B corresponding to instances 108A and 108B. VN 102B has a network address block of 10.0.0.0/16 (in Classless Inter-Domain Routing (CIDR) notation). The instance 108A has a network address of 10.0.0.1 and domain name of database1.db.com. The instance 108B has a network address of 10.0.0.2 and domain name of database2.db.com. The resource owner endpoint 106A has network address within VN 102B of 10.200.0.1. In creating the resource owner endpoint 106A, the virtual network interlink service 101 has assigned the endpoint 106A an endpoint identifier of VNE-2C33 that the virtual network interlink service 101 can use for endpoint management and routing operations.

"Instance" refers to a generic resource that is hosted by the cloud provider network such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

In the illustrated example, an administrator of the VN 102A has created a resource consumer endpoint 104A via the virtual network interlink service 101 within VN 102A. VN 102A has a network address block of 10.0.0.0/16. The resource consumer endpoint 104A has an assigned address prefix of 10.100.0.0/28. In creating the resource consumer endpoint 104A, the virtual network interlink service 101 has assigned the endpoint 104A an endpoint identifier of VNE-A245 that the virtual network interlink service 101 can use for endpoint management and routing operations.

The administrator of the VN 102A has also granted access to the shared resources of instances 108A and 108B via the resource consumer endpoint 104A. In doing so, the virtual network interlink service 101 has associated addresses within the resource consumer endpoint 104A prefix to the instances 108A and 108B. In particular, the virtual network interlink service 101 associated the network address 10.100.0.0 to the shared resource of instance 108A and the network address 10.100.0.1 to the shared resource of instance 108B. Based on the associated addresses, the virtual network interlink service 101 updates a virtual name service 110A of VN 102A to include records to reflect the availability of the domain names of the shared resources via their newly associated addresses within VN 102A (e.g., database1.db.com→10.100.0.0 and database2.db.com→10.100.0.1).

In some examples, the virtual network interlink service 101 maintains various metadata to describe and track inter-virtual network connectivity. For example, the virtual network interlink service 101 can maintain mapping data 150 that can be used for inter-VN routing. Given the illustrated resource sharing arrangement from VN 102B to VN 102A, the mapping data 150 includes an entry to direct traffic received at the resource consumer endpoint 104A (with identifier VNE-A245) directed to the network address 10.100.0.0 associated with instance 108A to the actual network address 10.0.0.1 of instance 108A within VN 102B via the resource owner endpoint 106A (with identifier VNE-2C33). The mapping data 150 further includes an entry to direct traffic received at the resource consumer endpoint 104A (with identifier VNE-A245) directed to the network address 10.100.0.1 associated with instance 108B to the actual network address 10.0.0.2 of instance 108B within VN 102B via the resource owner endpoint 106A (with identifier VNE-2C33). The virtual network interlink service 101 can also store other metadata such as endpoint data 160, endpoint configuration data 170, and lookup data 180, described below.

With the endpoints 104A and 106A established, instances in VN 102A can now send messages to shared resources 108A and 108B in VN 102B. An example of a message sent from the instance 108D to the instance 108A is now described. The instance 108D can obtain the associated network address of the database1.db.com domain name from the name server 110A (10.100.0.0). The instance 108D can transmit a message (e.g., a packet) having a destination network address of 10.100.0.0 to a port of the resource being accessed (in this example, 3306) and a source network address of the instance (10.0.0.1) and port as determined by the instance (in this example, 1234). A virtual router (not shown) routes the packet to the resource consumer endpoint 104A based on the destination network address 10.100.0.0 falling within the assigned prefix. The resource consumer endpoint 104A sends the packet to the virtual network interlink service 101.

Using the mapping data 150, the virtual network interlink service 101 can route traffic directed to a resource consumer endpoint of one VN to the corresponding shared resource of another VN via a resource owner endpoint. In particular, the virtual network interlink service 101 can use the destination address of a message received by a resource consumer endpoint and the associated endpoint identifier to identify the actual address of the shared resource on its VN and the associated resource owner endpoint that provides connectivity to that VN. In the illustrated example, the mapping data maps a packet destined to 10.100.0.0 received at VNE-A245 to a destination address of 10.0.0.1 via VNE-2C33. The virtual network interlink service 101 changes the destination addressing of the packet from 10.100.0.0:3306 to 10.0.0.1:3306.

In some examples, the virtual network interlink service 101 evaluates a security policy associated with the target resource owner endpoint prior to routing the request from a resource consumer endpoint to the resource owner endpoint. The security policy can include a list of permitted or prohibited ports or protocols that can traverse the resource owner endpoint. Provided the traffic received from a resource consumer endpoint is allowed or not prohibited by a security policy associated with the target resource owner endpoint in the mapping data, the virtual network interlink service 101 can route the traffic to the resource owner endpoint. Otherwise, the virtual network interlink service 101 can block the request. Security policies associated with resource owner endpoints can be stored in endpoint data 160 as described below.

In some examples, the virtual network interlink service 101 can also modify the source address and port of a message. Since many different instances (in potentially many different VNs) may be accessing a shared resource, the virtual network interlink service 101 can use port mapping to track where to send packets received by the resource owner endpoint back from the shared resource. In the forward direction (e.g., for traffic transiting from a resource consumer endpoint to a resource owner endpoint), the virtual network interlink service 101 can map the source network address, port, and an identifier of the origin VN (e.g., using a VN identifier or a resource consumer endpoint identifier) to an available port at the resource owner endpoint. In the illustrated example, the virtual network interlink service 101 maps the packet having a source network address of 10.0.0.1 and port 1234 received at VNE-A245 to port 2345 of the resource owner endpoint 106A having network address 10.200.0.1 and stores the mapping. Using this mapping, the virtual network interlink service 101 changes the source addressing of the packet from 10.0.0.1: 1234 to 10.200.0.1:2345.

In the reverse direction (e.g., for traffic transiting back from a resource owner endpoint to a resource consumer endpoint), the virtual network interlink service 101 can obtain the destination address, port, and resource consumer endpoint identifier using the destination address port. For example, for a packet received from the instance 108A with destination addressing to 10.200.0.1:2345, the virtual network interlink service 101 determines the destination network address of 10.0.0.1 and port 1234 using the previously stored mapping for port 2345. The virtual network interlink service 101 changes the destination addressing of the packet from 10.200.0.1:2345 to 10.0.0.1:1234 and sends the packet via VNE-A245 (also determined from the stored mapping).

In this example, the administrator of VN 102B has shared the instances 108A and 108B with VN 102A. Such sharing is typically explicitly specified in one or more permissions policies defined by the administrator of VN 102B as described below. Thus, while instances in VN 102A can access instances 108A and 108B, other instances in VN 102B (not shown) remain inaccessible. The administrator of VN 102B has not shared either of instances 108A or 108B with VN 102D. Thus, communication from instances (not shown) of VN 102D to VN 102B is not possible.

With reference to VN 102C, an administrator of VN 102C has created a resource owner endpoint 106B via the virtual network interlink service 101 within VN 102C and shared a resource of VN 102C corresponding to instance 108C. VN 102C has a network address block of 172.31.0.0/16. The instance 108C has a network address of 172.31.0.1 and domain name of c1.compute.com. The resource owner endpoint 106B has network address prefix assigned to it within VN 102C of 172.31.1.0/28. A network prefix can be assigned to a resource owner endpoint to limit the likelihood of port exhaustion. In creating the resource owner endpoint 106B, the virtual network interlink service 101 has assigned the endpoint 106B an endpoint identifier of VNE-F885 that the virtual network interlink service 101 can use for endpoint management and routing operations.

In this example, the administrator of VN 102C has shared the instance 108C with both VNs 102A and 102D.

The administrator of the VN 102A has granted access to the shared resource of instance 108C via the resource consumer endpoint 104A. In doing so, the virtual network interlink service 101 has associated an address within the resource consumer endpoint 104A prefix to the instance 108C. In particular, the virtual network interlink service 101 associated the network address 10.100.0.3 to the shared resource of instance 108C. Based on the associated address, the virtual network interlink service 101 updates the virtual name service 110A of VN 102A to include a record to reflect the availability of the domain name of the shared resource via its newly associated address within VN 102A (e.g., c1.compute.com→10.100.0.3).

An administrator of the VN 102D has created a resource consumer endpoint 104B via the virtual network interlink service 101 within VN 102D. VN 102D has a network address block of 10.0.0.0/16. The resource consumer endpoint 104B has an assigned address prefix of 10.50.0.0/28. In creating the resource consumer endpoint 104B, the virtual network interlink service 101 has assigned the endpoint 104B an endpoint identifier of VNE-D772 that the virtual network interlink service 101 can use for endpoint management and routing operations.

The administrator of the VN 102D has also granted access to the shared resource of instance 108C via the resource consumer endpoint 104B. In doing so, the virtual network interlink service 101 has associated an address within the resource consumer endpoint 104B prefix to the instance 108C. In particular, the virtual network interlink service 101 associated the network address 10.50.0.1 to the shared resource of instance 108C. Based on the associated address, the virtual network interlink service 101 updates the virtual name service 110B of VN 102D to include a record to reflect the availability of the domain name of the shared resource via its newly associated address within VN 102D (e.g., c1.compute.com→10.50.0.1).

Given the illustrated resource sharing arrangement from VN 102C to VNs 102A and 102D, the mapping data 150 includes an entry to direct traffic received at the resource consumer endpoint 104A (with identifier VNE-A245) directed to the network address 10.100.0.3 associated with instance 108C to the actual network address 172.31.0.1 of instance 108C within VN 102C via the resource owner endpoint 106B (with identifier VNE-F885). The mapping data 150 further includes an entry to direct traffic received at the resource consumer endpoint 104B (with identifier VNE-D772) directed to the network address 10.50.0.1 associated with instance 108C to the actual network address 172.31.0.1 of instance 108C within VN 102C via the resource owner endpoint 106B (with identifier VNE-F885). Note here that the "local" network address within different VNs of a common shared resource can be different (e.g., the network address 10.100.0.3 in VN 102A is associated with instance 108C while the network address 10.50.0.1 in VN 102D is associated with instance 108C).

In the illustrated example with the endpoints 104A, 104B, and 106B established, instances in VN 102A or 102D can now send messages to shared resource 108C in VN 102D. The detailed transit of a message from such an instance to a shared resource is described above. Briefly, the instance 108E can obtain the network address of c1.compute.com from the name server 110A and send a message having a destination address of the obtained network address (10.100.0.3). Since the address falls within the prefix assigned to the resource consumer endpoint 104A, the virtual router (not shown) routes the message to the resource consumer endpoint 104A, which sends the message to the virtual network interlink service 101. Using the mapping data 150, the virtual network interlink service 101 changes the destination addressing from 10.100.0.3:9870 to 172.31.0.1:9870. The virtual network interlink service 101 can also store port mapping data and change the source addressing from 10.0.0.2:5555 (of the instance 108E) to 172.31.1.0:7777 (of the resource owner endpoint 106B).

In some examples, the various components illustrated in FIG. 1 can be implemented as software processes executed by one or more computer systems of the cloud provider network. For example, the instances 108 may be virtual machine or container processes executed within host environments of host systems used for customer resource virtualization. The resource endpoints 104, 106, the name servers 110, other virtual networking components such as virtual routers (not shown), and the virtual network interlink service 101 can be executed by a separate set of host systems used for control plane operations.

One advantage of the examples of the virtual network interlink service 101 described herein is that VNs across which resources are shared can have partially or fully overlapping network address ranges (e.g., CIDR blocks). For example, VN 102A and VN 102B each have CIDR blocks 10.0.0.0/16. Overlapping address ranges are possible because the virtual network interlink service 101 associates an available network address in the VN having the resource consumer endpoint with a shared resource and translates that associated network address to the actual network address of the shared resource in the VN having the resource owner endpoint.

Another advantage of the examples of the virtual network interlink service 101 described herein is the direct intra-VPC connectivity from a resource owner endpoint to an associated shared resource. Setting aside VPC-native components such as a virtual router, "direct" here refers to the absence of another device on the VPC between the resource owner endpoint and the shared resource (e.g., there is no load balancer). For example, traffic from the resource owner endpoint 106A transits the VPC directly to the instance 108A.

While the examples illustrated and described illustrate only one type of resource endpoint per VN, multiple resource endpoints of the same or different types can be created per VN. For example, a VN can include multiple resource consumer endpoints with different network address prefix delegations (e.g., due to available prefix sizes being smaller than the number of shared resources to be accessed). As another example, a VN can include a resource consumer endpoint to access a shared resource in another VN and also include a resource owner endpoint to share a resource with other VNs. As another example, a VN can include multiple resource owner endpoints (e.g., to prevent port exhaustion)

While the examples illustrated and described contemplate a bifurcation of resource endpoints into resource owner endpoints and resource consumer endpoint, other examples can combine the functionality into a generic endpoint type that provides for both the targeted sharing of resources within a VN to other VNs and the access to shared resources in other VNs.

Often, the virtual network interfaces of a VN encrypt and decrypt traffic transiting that VN. For example, a virtual network interface attached to the instance 108D (not shown) would encrypt traffic destined for the resource consumer endpoint 104A, which in turn would decrypt the traffic. Similarly, the resource owner endpoint 106A would encrypt traffic destined for a virtual network interface attached to the instance 108A (not shown), which in turn would decrypt the traffic. In some examples, the virtual network interlink service 101 includes a VN across which traffic is encrypted. Thus, as part of routing messages between VNs, the virtual network interlink service 101 encrypts traffic entering the virtual network interlink service 101 from a resource consumer endpoint and decrypts traffic exiting the virtual network interlink service 101 to a resource owner endpoint (and vice versa once a communications session is established).

In some examples, the inter-VN connectivity can extend to on-premises (or "on-prem") equipment provided routability between such equipment and a VN. For example, an on-prem computer system (not shown) with connectivity to the VN 102A could access the instance 108A via the resource consumer endpoint 104A. As another example, an on-prem computer system (not shown) accessible to devices on VN 102B could be shared via the resource owner endpoint 106A. Examples of techniques to provide routability between an on-prem network or device include a virtual private network connection to the cloud-based virtual network and a virtual gateway for traffic entering or exiting the virtual network from or to an on-prem network.

While the description of examples herein relies on Internet Protocol version 4 (IPv4) addressing, other examples can use Internet Protocol version 6 (IPv6) addressing or a combination of IPv4 and IPv6 addressing.

Figure 2:
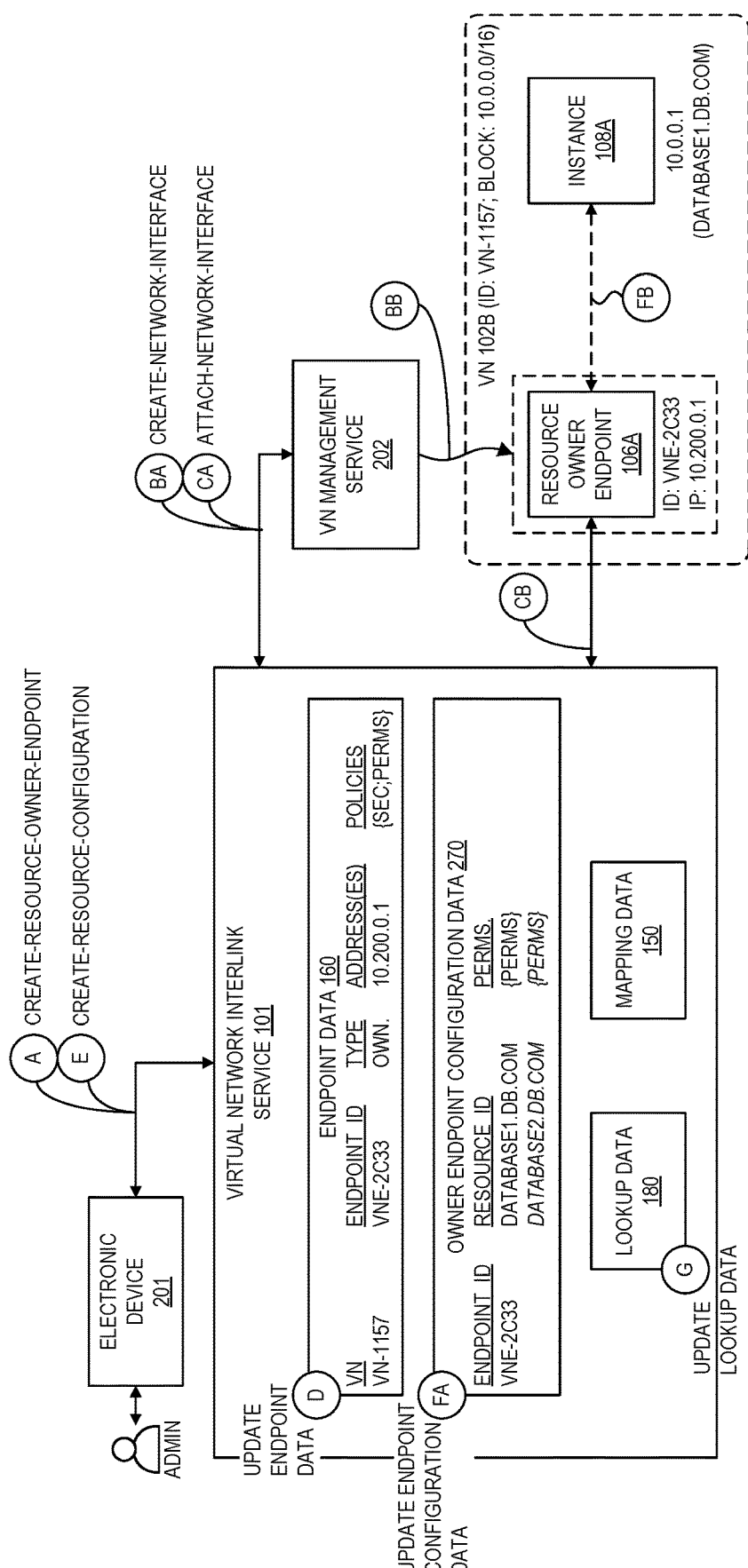
FIG. 2 illustrates an environment for sharing a resource in a virtual network of a cloud provider network according to some examples.

FIG. 2 illustrates an environment for sharing a resource in a virtual network of a cloud provider network according to some examples. In particular, various exemplary configuration operations associated with sharing a resource are described with reference to the circled letters A through G. In this example, an administrator of the VN 102B interacts with the virtual network interlink service 101 via an electronic device 201 and one or more interface(s), such as through use of application programming interface (API) calls issued through a program or website, via commands issued via a web-based console or application, etc.

At circle A, the virtual network interlink service 101 receives a create-resource-owner-endpoint request (requests may also be referred to as commands). The create-resource-owner-endpoint request allows the virtual network interlink service 101 to establish a foothold within a specified VN using a resource owner endpoint. Here, the create-resource-owner-endpoint request includes an identification of VN 102B using a VN identifier VN-1157 assigned to the VN. The create-resource-owner-endpoint request can include one or more parameters such as an identification of the virtual network (or of one or more of its subnetworks, if subnetted). In some examples, an optional parameter—assign-prefixes <N> in the create-resource-owner-endpoint request is whether to assign N prefixes to the resource owner endpoint. Such prefixes can be expressly identified or automatically assigned by another service based on available network addresses within the VN. As alluded to above, assigning a network address prefix having a block of addresses (e.g., a /28 block) to a resource owner endpoint can reduce the likelihood of port exhaustion during operation. The create-resource-owner-endpoint request may default to a single network address assignment unless the assign-prefixes parameter is specified, in which case the specified number of prefixes will be assigned to the resource owner endpoint.

In some examples, an optional parameter—security-policy <policy_document> in the create-resource-owner-endpoint request allows the administrator to specify a security policy for the resource owner endpoint. An exemplary security policy can be specified in an authorable format such as JavaScript Object Notation (JSON) and can include an allow-list to specify which ports or protocols are permitted to transit the resource owner endpoint and/or a block-list to specify which ports or protocols are prohibited from transiting the resource owner endpoint.

In some examples, an optional parameter—endpoint-permissions-policy <policy_document> in the create-resource-owner-endpoint request allows the administrator to specify a permissions policy for the resource owner endpoint. An exemplary permissions policy can be specified in an authorable format such as JSON and typically includes an allow-list to explicitly identify certain entities (e.g., other virtual networks by virtual network identifier) that can access resources shared via the resource owner endpoint. Entity identification can be specified at various identity and access management (IAM) levels such as user account, role, organizational unit, organization, or other identity dimension.

As part of processing the create-resource-owner-endpoint request, the virtual network interlink service 101 issues a create-network-interface request to a VM management service 202 of the cloud provider network as indicated at circle BA, the create-network-interface request including an identification of the VN or subnet identified in the request received at circle A and addressing information (e.g., whether to assign an address, multiple addresses, a prefix, or multiple prefixes to the VNI). The VM management service 202 provides for the management of VNs including through operations such as creating, configuring, and deleting VNIs; updating route tables for the virtual router of a VN; adding, configuring, and removing gateways to route VN ingress and egress traffic; and so on. As indicated at circle BB, the VM management service 202 creates the VNI in VN 102B, assigns it an identifier, and obtains a VN network address or addresses to assign to the VNI (e.g., using the Dynamic Host Configuration Protocol (DHCP)). The VM management service 202 returns the identifier and an indication of the assigned network address(es) to the virtual network interlink service 101. Here, the VNI is assigned the identifier VNE-2C33 and the address 10.200.0.1.

As indicated at circle CA, the virtual network interlink service 101 issues an attach-network-interface request to the VM management service 202 that includes a VNI identifier and a target identifier to attach the identified VNI to. Attachment of a VNI to a virtualized resource such as an endpoint or instance typically includes routing network device I/O between the virtualized environment (e.g., virtual machine process, container process, etc.) and the virtual network. The request includes a target identifier associated with the virtual network interlink service 101 to provide the virtual network interlink service an attachment (or foothold) to VN 102B. As indicated at circle CB, the VM management service 202 creates the attachment between the VNI and the virtual network interlink service 101. In this manner, the VNI 106A serves as a resource endpoint based on its connectivity between the VN 102B and the virtual network interlink service 101.

As indicated at circle D, the virtual network interlink service 101 updates endpoint data 160. The virtual network interlink service 101 uses endpoint data 160 to track each of the resource consumer and resource owner endpoints that have been established in VNs of the cloud provider network. Here, the virtual network interlink service 101 updates the endpoint data 160 based on the creation of the resource owner endpoint 106A. In the exemplary endpoint data 160, the entry associated with the resource owner endpoint 106A includes a VN identifier (VN-1157), an endpoint identifier (VNE-2C33), an endpoint type (e.g., whether owner or consumer), the address(es) assigned to the endpoint (here, 10.200.0.1), and one or more policies associated with the endpoint such as a security policy and/or endpoint permissions policy included with the create-resource-owner-endpoint request.

As indicated at circle E, the virtual network interlink service 101 receives a create-resource-configuration request. The create-resource-configuration requests initiates the creation of a routable path between the resource owner endpoint of a VN and a specific resource in that VN to be shared via the resource owner endpoint. The create-resource-configuration request can include one or more parameters such as an identification of the resource to be shared and an identification of the resource owner endpoint through which to share the identified resource. The resource to be shared can be identified via a resource name unique to the resource within the cloud provider network, a domain name, or a network address, each of which can typically be used to identify the others through other cloud provider network management data. The resource owner endpoint can be identified by its associated endpoint identifier. Here, the request identifies the resource database1.db.com and the resource owner endpoint VNE-2C33.

In some examples, an optional parameter—resource-per-missions-policy <policy_document> in the create-resource-configuration request allows the administrator to specify a permissions policy applicable to shared resource. An exemplary permissions policy can be specified in an authorable format such as JSON and typically includes an allow-list to explicitly identify certain entities that can access resources shared via the resource owner endpoint. Entity identification can be specified at various IAM levels such as user account, role, organizational unit, organization, or other identity dimension. As compared to an endpoint permissions policy, the resource permissions policy allows an administrator to identify which entities can access a particular resource (subject to the endpoint permissions policy).

As indicated at circle FA, the virtual network interlink service 101 updates owner endpoint configuration data 270 (e.g., part of endpoint configuration data 170). The virtual network interlink service 101 uses owner endpoint configuration data 270 to track which resources have been shared via a resource owner endpoint. Here, the virtual network interlink service 101 updates the owner endpoint configuration data 270 based on the create-resource-configuration request. In the exemplary owner endpoint configuration data 270, the entry created for the create-resource-configuration request for VNE-2C33 includes an identification of the resource to be shared (e.g., database1.db.com or other resource identifier) and the resource permissions policy, if any. The entry in the owner endpoint configuration data 270 allows for a routable path between the resource owner endpoint VNE-2C33 and the shared resource database1.db.com, as indicated at circle FB.

In some examples, the virtual network interlink service 101 can support a modify-resource-owner-endpoint request that identifies a resource owner endpoint to be modified and the modification(s) to make. For example, the administrator can use the modify-resource-owner-endpoint request to change the endpoint security policy and/or the endpoint permissions policy. Upon receipt of a modify-resource-owner-endpoint request, the virtual network interlink service 101 can update the endpoint data 160.

In some examples, the virtual network interlink service 101 can support a modify-resource-configuration request that identifies a resource owner endpoint and shared resource to be modified and the modification(s) to make. For example, the administrator can use the modify-resource-configuration request to change the resource permissions policy. Upon receipt of a modify-resource-configuration request, the virtual network interlink service 101 can update the owner endpoint configuration data 270.

In some examples, when the virtual network interlink service 101 updates either the endpoint data 160 or the owner endpoint configuration data 270, it can also update the lookup data 180 as indicated at circle G. The lookup data 180 facilitates the discovery of shared resources at resource consumer endpoints. The lookup data 180 can be indexed in one or more identity dimensions. For example, the lookup data 180 can include a dimension associated with user accounts, roles, organizational units, organizations, and/or other identity dimensions. When an entity (e.g., such as an administrator of a VN having a resource consumer endpoint) initiates shared resource discovery (e.g., via a describe-endpoint-resources API request, described below), the virtual network interlink service 101 can quickly identify each shared resource permitted to that entity based on one or more identity dimensions of the entity. For example, if a user has an associated account, role, and organization, the virtual network interlink service 101 can identify which resources are shared with that account, with that role, and with that organization.

The virtual network interlink service 101 can build the lookup data 180 based on the endpoint and resource permissions policies specified by administrators sharing resources via resource owner endpoints. For example, if an endpoint permissions policy permits access to shared resources via the associated resource owner endpoint to entities within Organization A, the virtual network interlink service 101 can add an entry to an organizations data structure for Organization A that identifies generally any resource shared through that resource owner endpoint. When an entity associated with Organization A initiates shared resource discovery, resources shared through that resource owner endpoint will be returned. If a resource permissions policy adds a user account to a particular shared resource configuration, the virtual network interlink service 101 can add an entry to a user accounts data structure for the user account that identifies the particular shared resource being shared through the resource owner endpoint.

In some examples, the virtual network interlink service 101 can support a delete-resource-owner-endpoint request that identifies a resource owner endpoint to be deleted. Upon receipt of a delete-resource-owner-endpoint request, the virtual network interlink service 101 can delete the entry associated with the identified resource owner endpoint from the endpoint data 160, delete any resource configurations associated with the identified resource owner endpoint from the owner endpoint configuration data 270, delete any lookups associated with the identified resource owner endpoint from the lookup data 180, and delete any mappings targeting the identified resource owner endpoint in the mapping data 150.

In some examples, the virtual network interlink service 101 can support a delete-resource-configuration request that identifies a resource owner endpoint and shared resource to be deleted from the resource owner endpoint. Upon receipt of a delete-resource-configuration request, the virtual network interlink service 101 can delete the associated shared resource entry from the resource owner endpoint in the owner endpoint configuration data 270 and any mappings to the identified shared resource in the mapping data 150.

Figure 3:
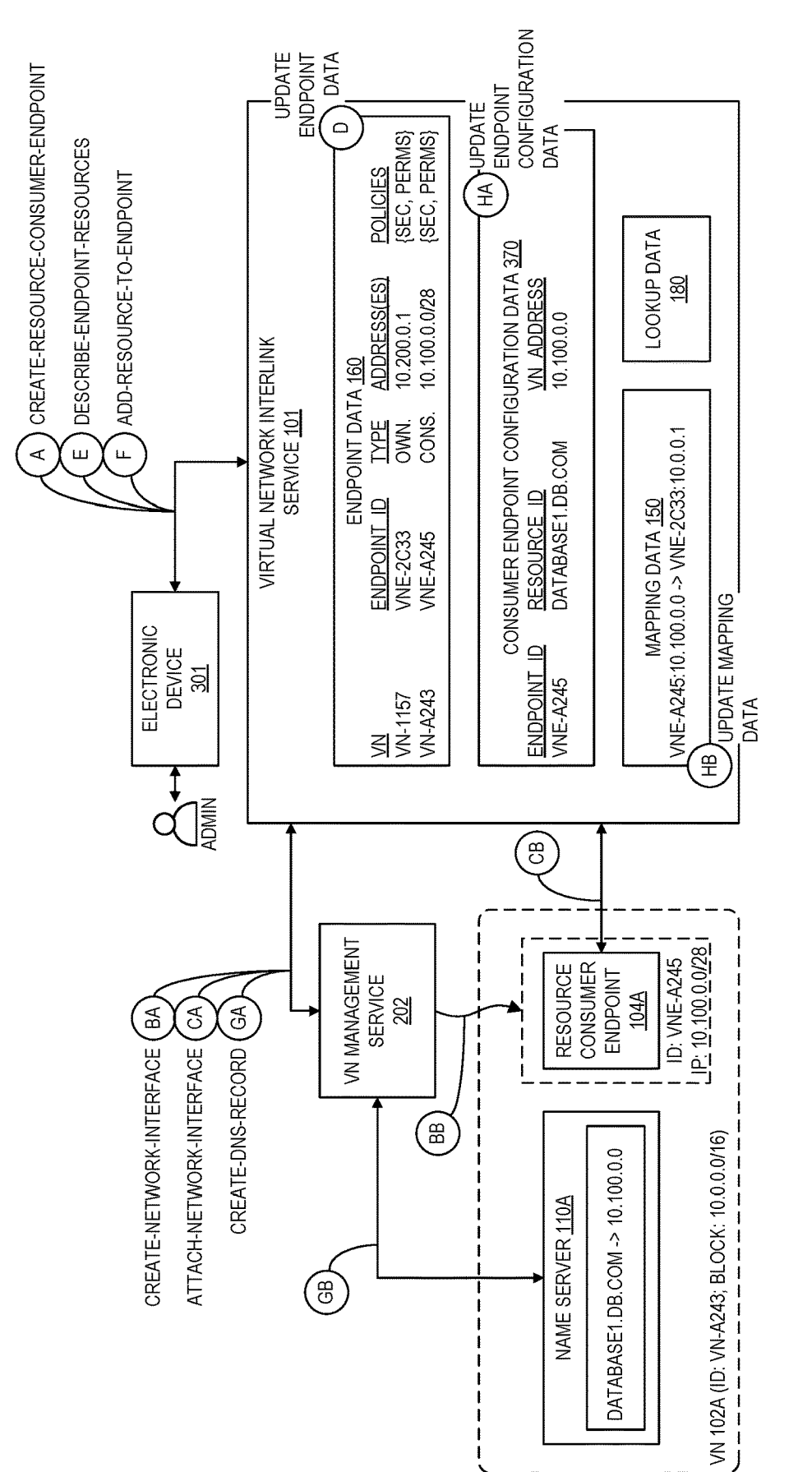
FIG. 3 illustrates an environment for accessing a shared resource in a virtual network of a cloud provider network according to some examples.

FIG. 3 illustrates an environment for accessing a shared resource in a virtual network of a cloud provider network according to some examples. In particular, various exemplary configuration operations associated with accessing a shared resource are described with reference to the circled letters A through H. In this example, an administrator of the VN 102A interacts with the virtual network interlink service 101 via an electronic device 301 and one or more interface (s), such as through use of application programming interface (API) calls issued through a program or website, via commands issued via a web-based console or application, etc.

At circle A, the virtual network interlink service 101 receives a create-resource-consumer-endpoint request. The create-resource-consumer-endpoint request allows the virtual network interlink service 101 to establish a foothold within a specified VN using a resource consumer endpoint. Here, the create-resource-consumer-endpoint request includes an identification of VN 102A using a VN identifier VN-A243 assigned to the VN. The create-resource-consumer-endpoint request can include one or more parameters such as an identification of the virtual network (or of one or more of its subnetworks, if subnetted). Assuming the resource consumer endpoint will provide access to more than one shared resource, the request typically includes a parameter—assign-prefixes <N> to assign N prefixes to the resource consumer endpoint. For example, a /28 block provides addressing to up to 16 different shared resources.

In some examples, an optional parameter—security-policy <policy_document> in the create-resource-consumer-endpoint request allows the administrator to specify a security policy for the resource consumer endpoint. An exemplary security policy can be specified in an authorable format such as JSON and can include an allow-list to specify which ports or protocols are permitted to transit the resource consumer endpoint and/or a block-list to specify which ports or protocols are prohibited from transiting the resource consumer endpoint.

In some examples, an optional parameter—endpoint-permissions-policy <policy_document> in the create-resource-consumer-endpoint request allows the administrator to specify a permissions policy for the resource consumer endpoint. An exemplary permissions policy can be specified in an authorable format such as JSON and typically includes an allow-list (rather than a block-list) to explicitly identify certain entities (e.g., other virtual networks by virtual network identifier) that can be accessed via the resource consumer endpoint. Entity identification can be specified at various IAM levels such as user account, role, organizational unit, organization, or other identity dimension.

As part of processing the create-resource-consumer-endpoint request, the virtual network interlink service 101 issues a create-network-interface request to the VM management service 202 of the cloud provider network as indicated at circle BA, the create-network-interface request including an identification of the VN or subnet identified in the request received at circle A and addressing information (e.g., whether to assign an address, multiple addresses, a prefix, or multiple prefixes to the VNI). As indicated at circle BB, the VM management service 202 creates the VNI in VN 102A, assigns it an identifier, and obtains a VN network address or addresses to assign to the VNI (e.g., using DHCP). The VM management service 202 returns the identifier and an indication of the assigned network address (es) to the virtual network interlink service 101. Here, the VNI is assigned the identifier VNE-A245 and the address prefix 10.100.0.0/28.

As indicated at circle CA, the virtual network interlink service 101 issues an attach-network-interface request to the VM management service 202 that includes a VNI identifier and a target identifier to attach the identified VNI to. The request includes a target identifier associated with the virtual network interlink service 101 to provide the virtual network interlink service an attachment (or foothold) to VN 102A. As indicated at circle CB, the VM management service 202 creates the attachment between the VNI and the virtual network interlink service 101. In this manner, the VNI 104A serves as a resource endpoint based on its connectivity between the VN 102A and the virtual network interlink service 101.

As indicated at circle D, the virtual network interlink service 101 updates endpoint data 160. Here, the virtual network interlink service 101 updates the endpoint data 160 based on the creation of the resource consumer endpoint 104A. In the exemplary endpoint data 160, the entry associated with the resource consumer endpoint 104A includes a VN identifier (VN-A243), an endpoint identifier (VNE-A245), an endpoint type (e.g., whether owner or consumer), the address(es) assigned to the endpoint (here, 10.100.0.0/28), and one or more policies associated with the endpoint such as a security policy and/or endpoint permissions policy included with the create-resource-consumer-endpoint request.

As indicated at circle E, the virtual network interlink service 101 receives a describe-endpoint-resources request. The describe-endpoint-resources request allows discovery of resources available for access via resource consumer endpoints by providing a response listing those available resources. To do so, the describe-endpoint-resources request returns an identification of available resources shared by the same or a different administrator via resource owner endpoints in other VNs. In some examples, the request can include identity data such as an indication of one of the identity dimensions described above, which the virtual network interlink service 101 can verify via another service of the cloud provider network such as an IAM service (not shown). Alternatively, the request can include an identification of a VN, and the virtual network interlink service 101 can obtain identity data associated with the VN. For example, the identity data can identify a user account, role, organizational unit, organization, and/or other identity dimension. The virtual network interlink service 101 can identify each shared resource available to those one or more identity dimensions using the lookup data 180. Continuing the example from FIG. 2, and assuming the admin that configured the resource owner endpoint 106A shared the instance 108A with an identity associated with the resource consumer endpoint 104A, the response would include an identification of the database1.db.com available via the resource owner endpoint VNE-2C33. The identification of the resource may be provided as one or more of the domain name of the resource, a unique identifier assigned to the resource, and/or a network address of the resource within its VN.

As indicated at circle F, the virtual network interlink service 101 receives an add-resource-to-endpoint request. The add-resource-to-endpoint request initiates the creation of a routable path to a resource shared via a resource owner endpoint via the resource consumer endpoint. The create-resource-configuration request can include one or more parameters such as an identification of the resource and an identification of the resource consumer endpoint to add the identified resource to. For example, the request can include an identification of VNE-2C33 and an identification of the database1.db.com resource by its domain name (or alternatively via a unique identifier of the resource, a network address, or other identifier).

The virtual network interlink service 101 can select one of the available network addresses associated with the resource consumer endpoint to associate with the identified shared resource. For example, if a /28 block of addresses was assigned to the resource consumer endpoint and five are used for other resources in other VNs, the virtual network interlink service 101 can select a network address from one of the remaining eleven available network addresses to associate with the shared resource. The virtual network interlink service 101 can track whether addresses associated with a resource consumer endpoint have been associated to a shared resource. In this example, the virtual network interlink service 101 associates the address 10.100.0.0 with the identified shared resource.

As indicated at circle GA, the virtual network interlink service 101 issues a create-dns-record request to the VM management service 202, the request including an identification of the local VN address selected to associate with the shared resource and the domain name of the shared resource. As indicated at circle GB, the VM management service 202 updates the name server 110A of the VN 102A to include a record associating the domain name database1.db.com with the associated address of the shared resource or 10.100.0.0. In other examples, the domain name of the shared resource need not be propagated into the VN having the resource consumer endpoint provided that devices within that VN access the shared resource via the associated network address.

As indicated at circles HA and HB, the virtual network interlink service 101 updates consumer endpoint configuration data 370 (e.g., part of endpoint configuration data 170) and mapping data 150. The virtual network interlink service 101 uses consumer endpoint configuration data 370 to track which shared resources have been added to a VN via a resource consumer endpoint. Here, the virtual network interlink service 101 updates the consumer endpoint configuration data 370 based on the create-resource-configuration request. In the exemplary consumer endpoint configuration data 370, the entry created for the create-resource-configuration request for VNE-A245 includes an identification of the shared resource to be accessed (here, database1.db.com) and the network address that is associated with the shared resource (here, 10.100.0.0). The virtual network interlink service 101 also creates an entry in mapping data 150 to link the shared resource from the resource consumer endpoint and associated network address to the resource owner endpoint and actual network address. Here, that entry links the associated network address 10.100.0.0 in VN 102A to the actual network address 10.0.0.1 of the shared resource in VN 102B (not shown) via the resource consumer endpoint 104A and the resource owner endpoint 106A (not shown) respectively having endpoint identifiers VNE-A245 and VNE-2C33.

In some examples, the virtual network interlink service 101 can support a modify-resource-consumer-endpoint request that identifies a resource owner endpoint to be modified and the modification(s) to make. For example, the administrator can use the modify-resource-consumer-endpoint request to change the endpoint security policy and/or the endpoint permissions policy. Upon receipt of a modify-resource-consumer-endpoint request, the virtual network interlink service 101 can update the endpoint data 160.

In some examples, the virtual network interlink service 101 can support a delete-resource-consumer-endpoint request that identifies a resource consumer endpoint to be deleted. Upon receipt of a delete-resource-consumer-endpoint request, the virtual network interlink service 101 can delete the entry associated with the identified resource owner endpoint from the endpoint data 160, delete any resource configurations associated with the identified resource owner endpoint from the consumer endpoint configuration data 370, delete any lookups associated with the identified resource owner endpoint from the lookup data 180, and delete any mappings from the identified resource consumer endpoint in the mapping data 150.

In some examples, the virtual network interlink service 101 can support a delete-resource-configuration request that identifies a resource consumer endpoint and shared resource to be deleted from the resource consumer endpoint. Upon receipt of a delete-resource-configuration request, the virtual network interlink service 101 can delete the associated shared resource entry from the resource consumer endpoint in the consumer endpoint configuration data 370 and any mappings to the identified shared resource in the mapping data 150.

Figure 4:
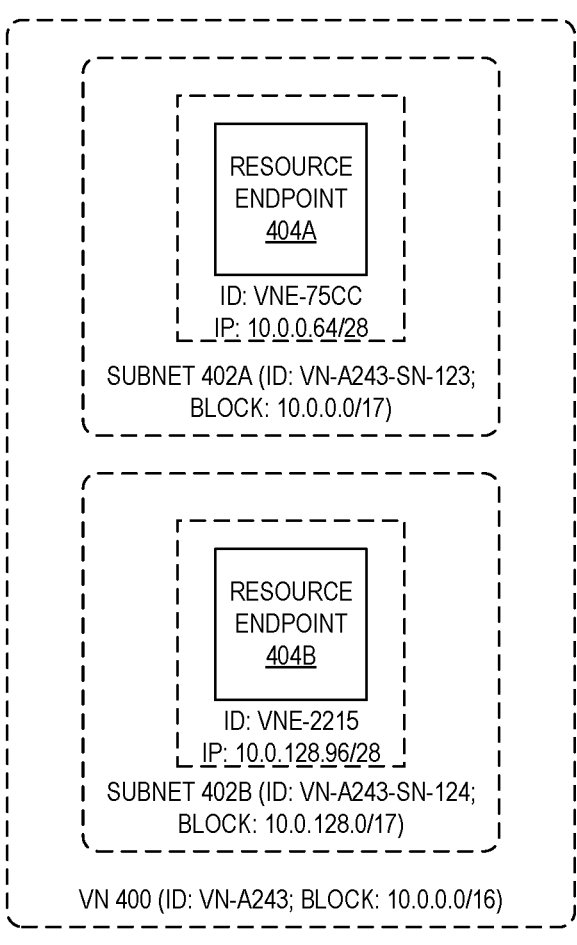
FIG. 4 illustrates an environment for resource sharing in a virtual network having subnetworks according to some examples.

FIG. 4 illustrates an environment for resource sharing in a virtual network having subnetworks according to some examples. As illustrated, a VN 400 VN has a network address block of 10.0.0.0/16. The VN is divided into two subnetworks subnet 402A and 402B respectively having identifiers VN-A243-SN-123 and VN-A243-SN-123 and assigned CIDR blocks 10.0.0.0/17 and 10.0.128.0/17. In some examples involving subnetted VNs, the virtual network interlink service 101 can create a resource endpoint (whether owner or consumer) in one or more of the VN subnets. The identification can be based on one or more parameters received with either the create-resource-owner-endpoint or the create-resource-consumer-endpoint requests. In some examples, an identification of a subnetted VN in the request can implicitly cause the virtual network interlink service 101 to create a resource endpoint within each of the VN subnets. For example, a request identifying VN-A243 can implicitly create resource endpoints in each subnetwork. In other examples, the request can require an explicit identification of one or more subnets of a subnetted VN in which to create resource endpoints. For example, a request can include the identification of subnets VN-A243-SN123 and VN-A243-SN123. In either case, the virtual network interlink service 101 creates a resource endpoint 404A within the subnet 402A and a resource endpoint 404B within the subnet 402B. If, however, the virtual network interlink service 101 request requires an explicit identification of subnets, a request identifying only one of subnets VN-A243-SN123 and VN-A243-SN123 would result in the creation of a resource endpoint in only the identified subnet (not shown).

In some examples, resource endpoints in different subnets of a VN can be treated as a group (e.g., the endpoint_id in owner endpoint configuration data 270 or in customer endpoint configuration data 370 includes multiple entries corresponding to each of the subnets). In other examples, each resource endpoint in different subnets can be managed independently allowing an administrator to share a resource in one subnet but not another (again, whether as an owner or consumer).

In some examples, network addresses are assigned to endpoints individually rather than as prefix groups. For example, an administrator might specify a set of network addresses to associate with an endpoint as part of associated create endpoint request.

FIG. 5 is a flow diagram illustrating operations 500 of a method for resource sharing between virtual networks of a cloud provider network according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the virtual network interlink service 101 of the other figures.

The operations 500 include, at block 502, associating a first network address of a first virtual network with a resource connected to a second virtual network, wherein the first virtual network and the second virtual network are part of the cloud provider network. The operations 500 further include, at block 504, receiving a message destined for the first network address. The operations 500 further include, at block 506, translating the first network address to a second network address of the resource in the second virtual network. The operations 500 further include, at block 508, sending the message to the resource at the second network address in the second virtual network.

Figure 6:
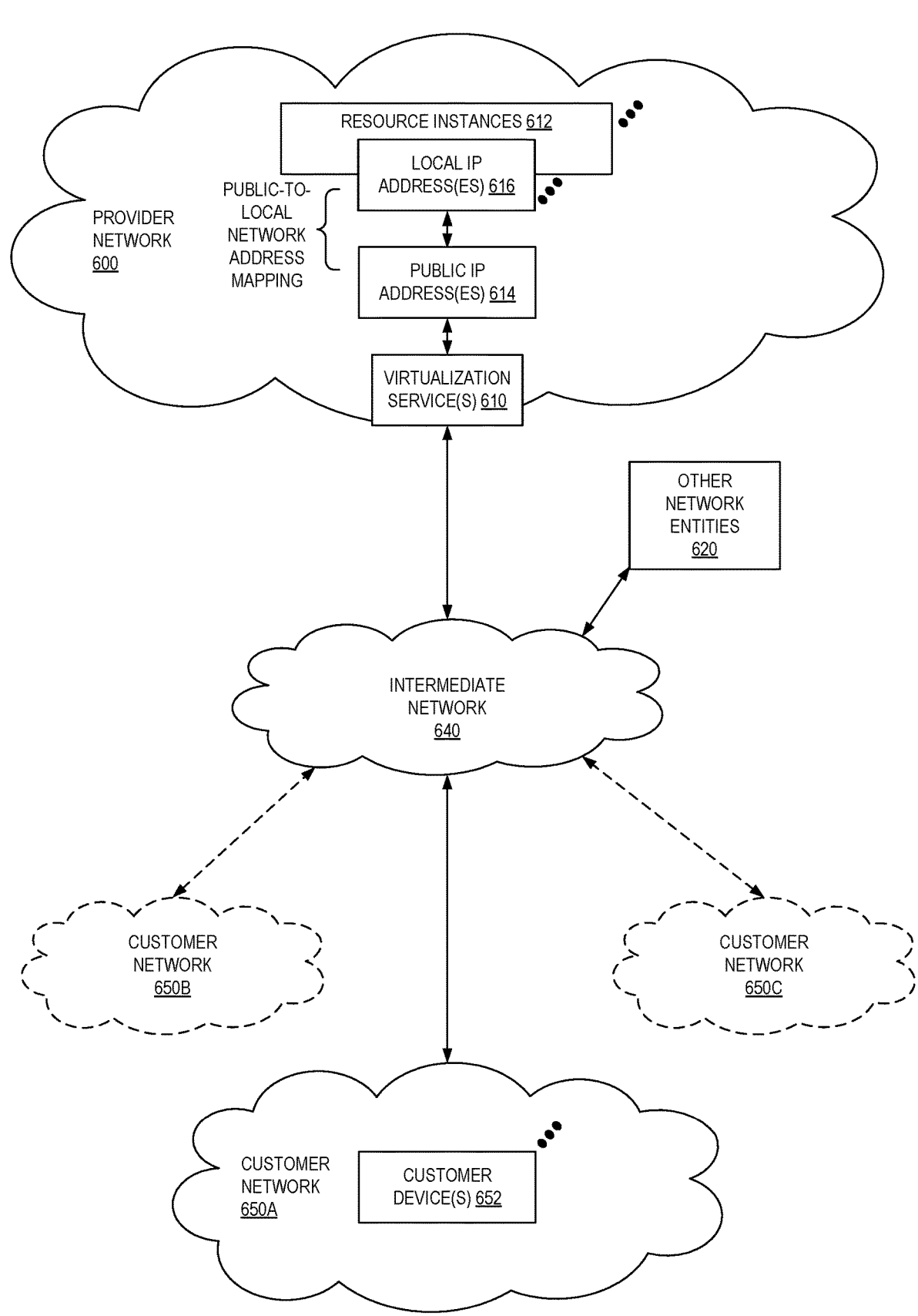
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
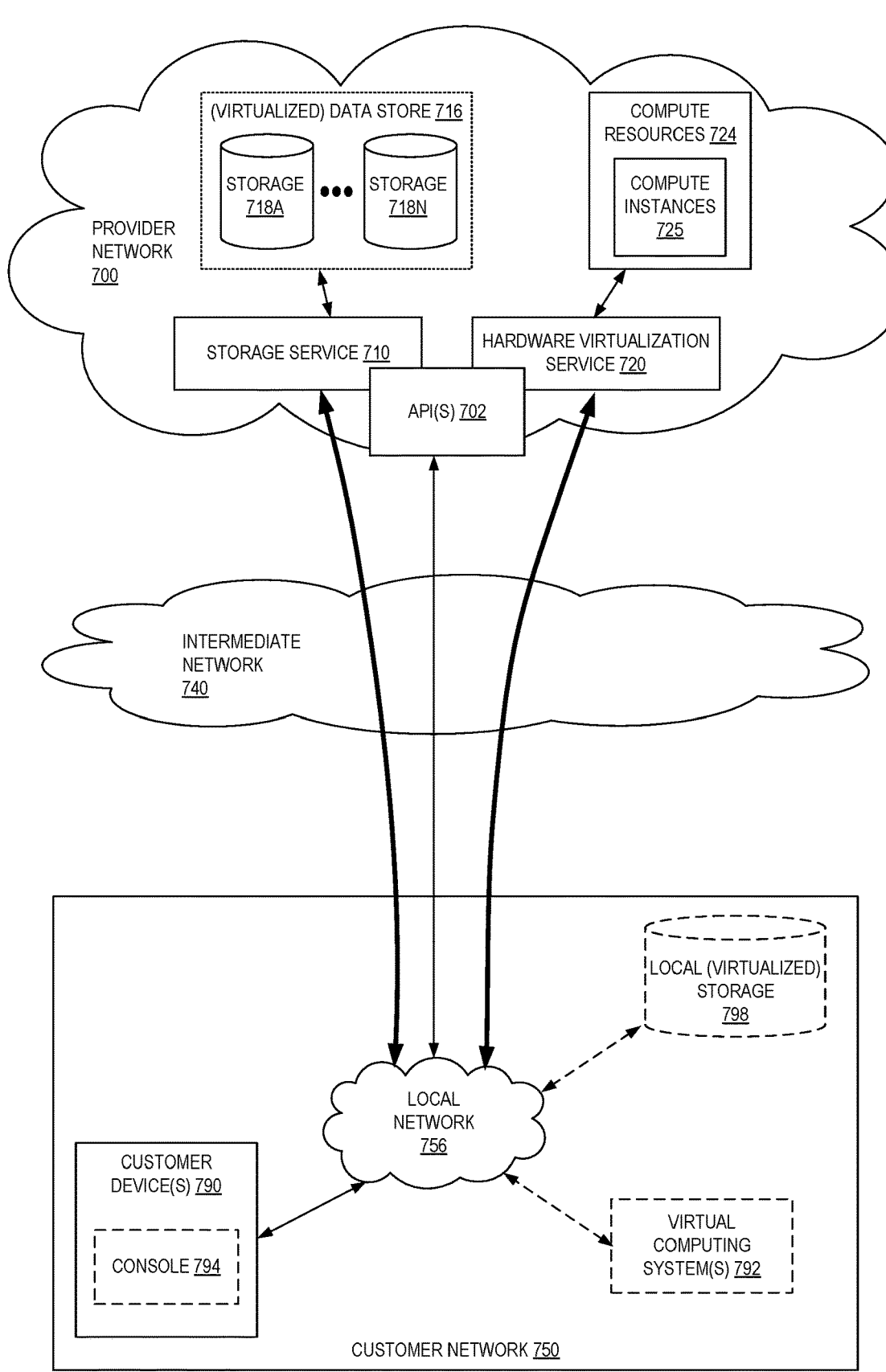
FIG. 7 illustrates an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the pro-vider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
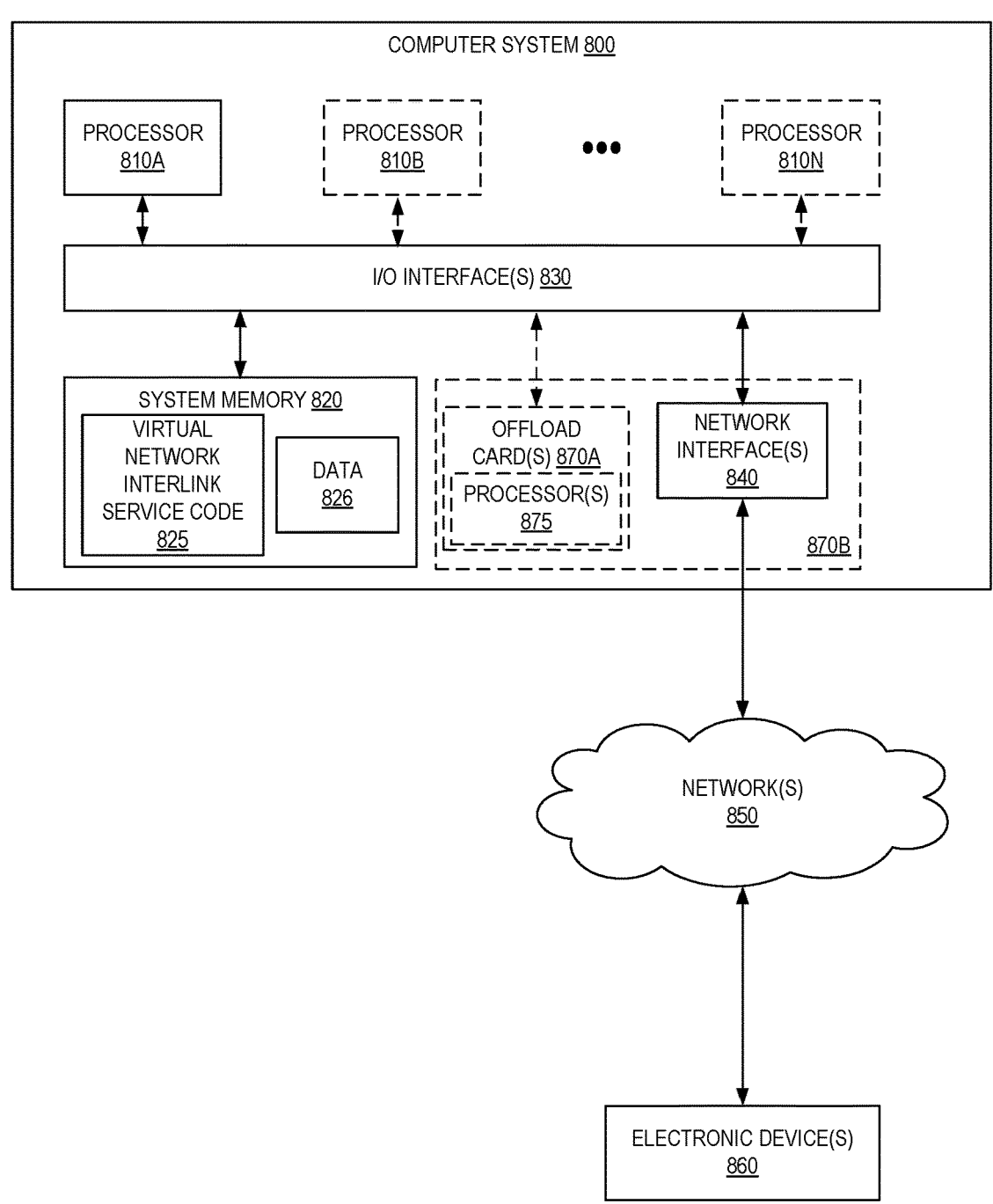
FIG. 8 illustrates an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as virtual network interlink service code 825 (e.g., executable to implement, in whole or in part, the virtual network interlink service 101) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an inter-face to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wire-less general data networks, such as types of Ethernet net-work, for example. Additionally, the network interface 840 can support communication via telecommunications/tele-phony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) stan-dard, or another interconnect such as a QuickPath intercon-nect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management opera-tions, such as pausing and/or un-pausing compute instances, launching and/or terminating compute instances, performing memory transfer/copying operations, etc. These manage-ment operations can, in some examples, be performed by the offload card(s) 870A or 870B in coordination with a hyper-visor (e.g., upon a request from a hypervisor) that is executed by the other processors 810A-810N of the com-puter system 800. However, in some examples the virtual-ization manager implemented by the offload card(s) 870A or 870B can accommodate requests from other entities (e.g., from compute instances themselves), and can not coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   by a virtual network interlink service of a cloud provider network:
      associating a first network address of a first virtual network in the cloud provider network with a second network address of a resource in a second virtual network, in the cloud provider network;
      receiving a request to create a virtual network interface between the virtual network interlink service and the second virtual network to share resources of the second virtual network with other virtual networks, the virtual network interface having a third network address on the second virtual network;
      creating the virtual network interface between the virtual network interlink service and the second virtual network;
      receiving a message destined for the first network address of the first virtual network;
      translating the first network address to the second network address of the resource in the second virtual network; and
      sending the message to the resource at the second network address in the second virtual network via the virtual network interface having the third network address on the second virtual network.

2. The computer-implemented method of claim 1, further comprising, by the virtual network interlink service:
   receiving a second request to associate the resource with the virtual network interface, the second request including an identification of the resource and an indication of the virtual network interface; and
   updating service metadata to associate the resource with the virtual network interface.

3. The computer-implemented method of claim 2, wherein the identification of the resource in the second request is at least one of a resource name unique to the resource within the cloud provider network, a domain name, or a network address.

4. The computer-implemented method of claim 2, wherein the second request further includes a permissions policy that identifies at least one of a user account, a role, an organizational unit, or an organization associated with the first virtual network as having permissions to access the resource.

5. The computer-implemented method of claim 1, further comprising, by the virtual network interlink service:

receiving a first request to create a virtual network interface between the virtual network interlink service and the first virtual network to access shared resources in other virtual networks; and creating the virtual network interface between the virtual network interlink service and the first virtual network, wherein the message destined for the first network address is received by the virtual network interlink service via the virtual network interface.

6. The computer-implemented method of claim 5, further comprising, by the virtual network interlink service:

receiving a request to identify resources shared with an identity, wherein the identity is at least one of a user account, a role, an organizational unit, or an organization of the first virtual network;

providing an identification of one or more resources shared with the identity that includes an identification of the resource connected to a second virtual network; and receiving a request to add the resource to the virtual network interface, wherein the first network address of the first virtual network is associated with the resource connected to the second virtual network based at least in part on the request to add the resource to the virtual network interface.

7. The computer-implemented method of claim 6, further comprising, by the virtual network interlink service updating a name server of the first virtual network with a record to associate a domain name of the resource connected to the second virtual network with the first network address.

8. The computer-implemented method of claim 5, further comprising, by the virtual network interlink service:

storing a mapping of the virtual network interface, a source network address of the message, and a source port of the message to a port of another virtual network interface between the virtual network interlink service and the second virtual network, wherein sending the message to the resource at the second network address in the second virtual network includes replacing the source network address of the message with a network address of the other virtual network interface and replacing the source port with the port of the other virtual network interface;

receiving a second message from the resource, the second message having a destination network address of the network address of the other virtual network interface and a destination port of the port of the other virtual network interface;

identifying the stored mapping based on the destination port of the second message;

replacing the destination network address of the second message with the source network address of the message in the stored mapping and replacing the destination port of the second message with the source port of the message in the stored mapping; and sending the second message to the first virtual network via the virtual network interface in the stored mapping.

9. A system comprising:

a first one or more electronic devices to implement a virtual network interlink service in a cloud provider network, the virtual network interlink service including instructions that upon execution by one or more processors cause the virtual network interlink service to:

associate a first network address of a first virtual network in the cloud provider network with a second network address of a resource in a second virtual network in the cloud provider network;

receive a request to create a virtual network interface between the service and the second virtual network to share resources of the second virtual network with other virtual networks, the virtual network interface having a third network address on the second virtual network;

create the virtual network interface between the service and the second virtual network;

receive a message destined for the first network address of the first virtual network;

translate the first network address to the second network address of the resource in the second virtual network via the virtual network interface having the third network address on the second virtual network; and send the message to the resource at the second network address in the second virtual network; and a second one or more electronic devices to host the resource in the second virtual network.

10. The system of claim 1, the virtual network interlink service includes further instructions that upon execution by the one or more processors cause the virtual network interlink service to:

receive a second request to associate the resource with the virtual network interface, the second request including an identification of the resource and an indication of the virtual network interface; and update service metadata to associate the resource with the virtual network interface.

11. The system of claim 10, wherein the identification of the resource in the second request is at least one of a resource name unique to the resource within the cloud provider network, a domain name, or a network address.

12. The system of claim 10, wherein the second request further includes a permissions policy that identifies at least one of a user account, a role, an organizational unit, or an organization associated with the first virtual network as having permissions to access the resource.

13. The system of claim 9, the virtual network interlink service includes further instructions that upon execution by the one or more processors cause the virtual network interlink service to:

receive a first request to create a virtual network interface between the service and the first virtual network to access shared resources in other virtual networks; and create the virtual network interface between the service and the first virtual network, wherein the message destined for the first network address is received by the service via the virtual network interface.

14. The system of claim 13, the virtual network interlink service includes further instructions that upon execution by the one or more processors cause the virtual network interlink service to:

receive a request to identify resources shared with an identity, wherein the identity is at least one of a user account, a role, an organizational unit, or an organization of the first virtual network;

provide an identification of one or more resources shared with the identity that includes an identification of the resource connected to a second virtual network; and receive a request to add the resource to the virtual network interface, wherein the first network address of the first virtual network is associated with the resource connected to the second virtual network based at least in part on the request to add the resource to the virtual network interface.

15. The system of claim 14, the virtual network interlink service includes further instructions that upon execution by the one or more processors cause the virtual network interlink service to update a name server of the first virtual network with a record to associate a domain name of the resource connected to the second virtual network with the first network address.

16. The system of claim 14, the virtual network interlink service includes further instructions that upon execution by the one or more processors cause the virtual network interlink service to receive a policy to associate with the resource, the policy granting access to the resource to at least one of an account, a role, an organization unit, or an organization associated with the second virtual network.

17. The system of claim 14, the virtual network interlink service includes further instructions that upon execution by the one or more processors cause the virtual network interlink service to:

store a mapping of the virtual network interface, a source network address of the message, and a source port of the message to a port of another virtual network interface between the virtual network interlink service and the second virtual network, wherein sending the message to the resource at the second network address in the second virtual network includes replacing the source network address of the message with a network address of the other virtual network interface and replacing the source port with the port of the other virtual network interface;

receiving a second message from the resource, the second message having a destination network address of the network address of the other virtual network interface and a destination port of the port of the other virtual network interface;

identifying the stored mapping based on the destination port of the second message;

replacing the destination network address of the second message with the source network address of the message in the stored mapping and replacing the destination port of the second message with the source port of the message in the stored mapping; and sending the second message to the first virtual network via the virtual network interface in the stored mapping.

* * * * *